US007195295B2

(12) United States Patent
Huang et al.

(10) Patent No.: US 7,195,295 B2
(45) Date of Patent: Mar. 27, 2007

(54) LATCH DRIVING UNIT FOR A DOOR LOCK

(75) Inventors: Chao-Ming Huang, Kaohsiung Hsien (TW); Mei-Kuei Lee, Kaohsiung Hsien (TW)

(73) Assignee: Taiwan Fu Hsing Industrial Co., Ltd. (TW)

( * ) Notice: Subject to any disclaimer, the term of this patent is extended or adjusted under 35 U.S.C. 154(b) by 137 days.

(21) Appl. No.: 11/072,477

(22) Filed: Mar. 4, 2005

(65) Prior Publication Data

US 2006/0208507 A1 Sep. 21, 2006

(51) Int. Cl.
*E05B 3/00* (2006.01)
*B60R 25/02* (2006.01)

(52) U.S. Cl. .................. 292/336.3; 292/347; 292/358; 70/224

(58) Field of Classification Search ............ 292/336.3, 292/347–349, 352, 355, 358, 359, 336.5, 292/DIG. 44, DIG. 53, DIG. 54, DIG. 60, 292/DIG. 64; 70/224, 367, 379 R, 472
See application file for complete search history.

(56) References Cited

U.S. PATENT DOCUMENTS 318,684 A * 5/1885 Beebe ........................ 292/358
883,857 A * 4/1908 Caley et al. .................. 70/367
1,024,371 A * 4/1912 Soley .......................... 70/346
1,590,680 A * 6/1926 Gates ......................... 292/348
1,874,877 A * 8/1932 Brauning ..................... 70/367
1,908,701 A * 5/1933 Falk ......................... 70/379 R
1,947,386 A * 2/1934 Fraim .......................... 70/367
2,213,262 A * 9/1940 Segal .......................... 70/461
5,664,445 A * 9/1997 Chang ........................... 70/34
5,788,296 A * 8/1998 Kuo et al. .................. 292/358
5,868,018 A * 2/1999 Kang .......................... 70/472
5,950,467 A * 9/1999 Dong .......................... 70/467
6,691,538 B1 * 2/2004 Yang et al. .................... 70/370
6,742,367 B2 * 6/2004 Wu ............................. 70/224
6,807,833 B1 * 10/2004 Huang et al. ................. 70/107
2002/0162368 A1 * 11/2002 Wu ............................. 70/224
2006/0156770 A1 * 7/2006 Huang et al. ................. 70/224

* cited by examiner

*Primary Examiner*—Brian E. Glessner
*Assistant Examiner*—Carlos Lugo
(74) *Attorney, Agent, or Firm*—Jackson Walker, LLP

(57) ABSTRACT

A latch driving unit is assembled in an exterior knob assembly of a door lock. The latch driving unit includes a pin, a resilient member, a locking disk, a rotatable disk, a torsion spring, a cap and a strip. The strip removably extends through the cap, torsion spring, rotatable disk, locking disk, resilient member and the pin. If the strip is bent with an incorrect length, it can be removed from the latch driving unit and replaced with an intact strip. Thus, the exterior knob assembly is still useful after replacing the strip, and waste is avoided.

7 Claims, 8 Drawing Sheets

LATCH DRIVING UNIT FOR A DOOR LOCK

BACKGROUND OF THE INVENTION

1. Field of the Invention

The present invention relates to a door lock with two knob (handle) assemblies, and more particularly to a latch driving unit for the door lock which is provided in an exterior knob assembly to connect the latch assembly to an interior knob assembly.

2. Description of Related Art

A conventional door lock with two knobs or handles etc has an exterior knob assembly provided at an exterior side of a door, an interior knob assembly provided at an interior side of the door, and a latch assembly received in the door and connected between the exterior knob assembly and the interior knob assembly.

With reference to FIGS. 7–8, the exterior knob assembly (30) has an exterior knob (31), a locking core (32) received in the exterior knob (31), a turnable barrel (33) connected to a rear end of the locking core (32), and a latch driving unit (34) connected to the latch assembly (not shown) and the interior knob assembly (not shown).

The latch driving unit (34) has a tubular cam (35) received in the turnable barrel (33). A resilient member (36) is received in the tubular cam (35). A tongue of the locking core (32) is inserted in a first end of the tubular cam (35), and a locking disk (37) is provided at a second end of the tubular cam (35) and has wings (not shown) radially extending outwards from the turnable barrel (33). A cap (38) is securely provided at a rear end of the turnable barrel (33), and a strip (39) is secured in the cap (38) and extends backwards.

When the exterior knob (31) is turned, the turnable barrel (33) and the tubular cam (35) are rotated, so a latch of the lock is pushed by the latch driving unit (34) to transversally move for opening the door.

In the conventional latch driving unit (34), the strip (39) has a plurality of nicks (not numbered) defined thereon. A user can bend the strip (39) at a proper nick corresponding to a thickness of the door and remove the unwanted part of the strip (39). However, the strip (39) is often broken at an incorrect nick and becomes too short for the door. Because the strip (39) is integrally formed with the cap (38) and the turnable barrel (13), it is impossible to individually replace the strip (39). Therefore, the exterior knob assembly (30) has to be abandoned, causing unnecessary cost and an inconvenience to assemble the lock.

Therefore, the invention provides a latch driving unit for a door lock to mitigate or obviate the aforementioned problems.

SUMMARY OF THE INVENTION

The main objective of the present invention is to provide a latch driving unit of which a strip can be individually replaced.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
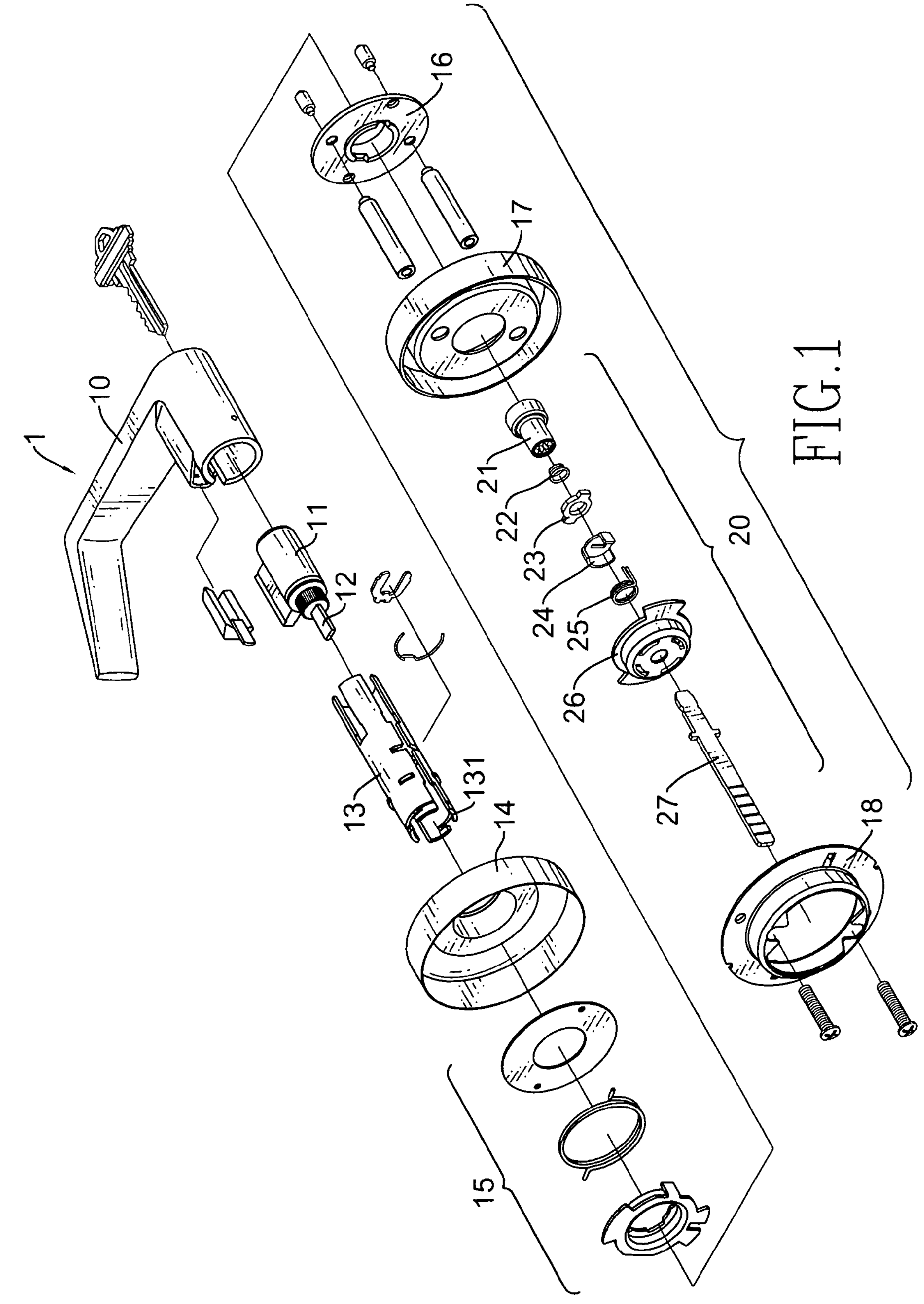
FIG. 1 is an exploded perspective view of an exterior knob assembly with a latch driving unit in accordance with the present invention.

With reference to FIG. 1, a latch driving unit (20) in accordance with the invention is assembled in an exterior handle assembly (1), which includes an exterior handle (10), a locking core (11), a turnable barrel (13), a panel cylinder (14), a torsion spring assembly (15), a gasket (16), an interior cylinder (17), and a back cylinder (18). Except the latch driving unit (20), the elements above have the same structures and shapes as those in the conventional door lock (30).

Figure 2:
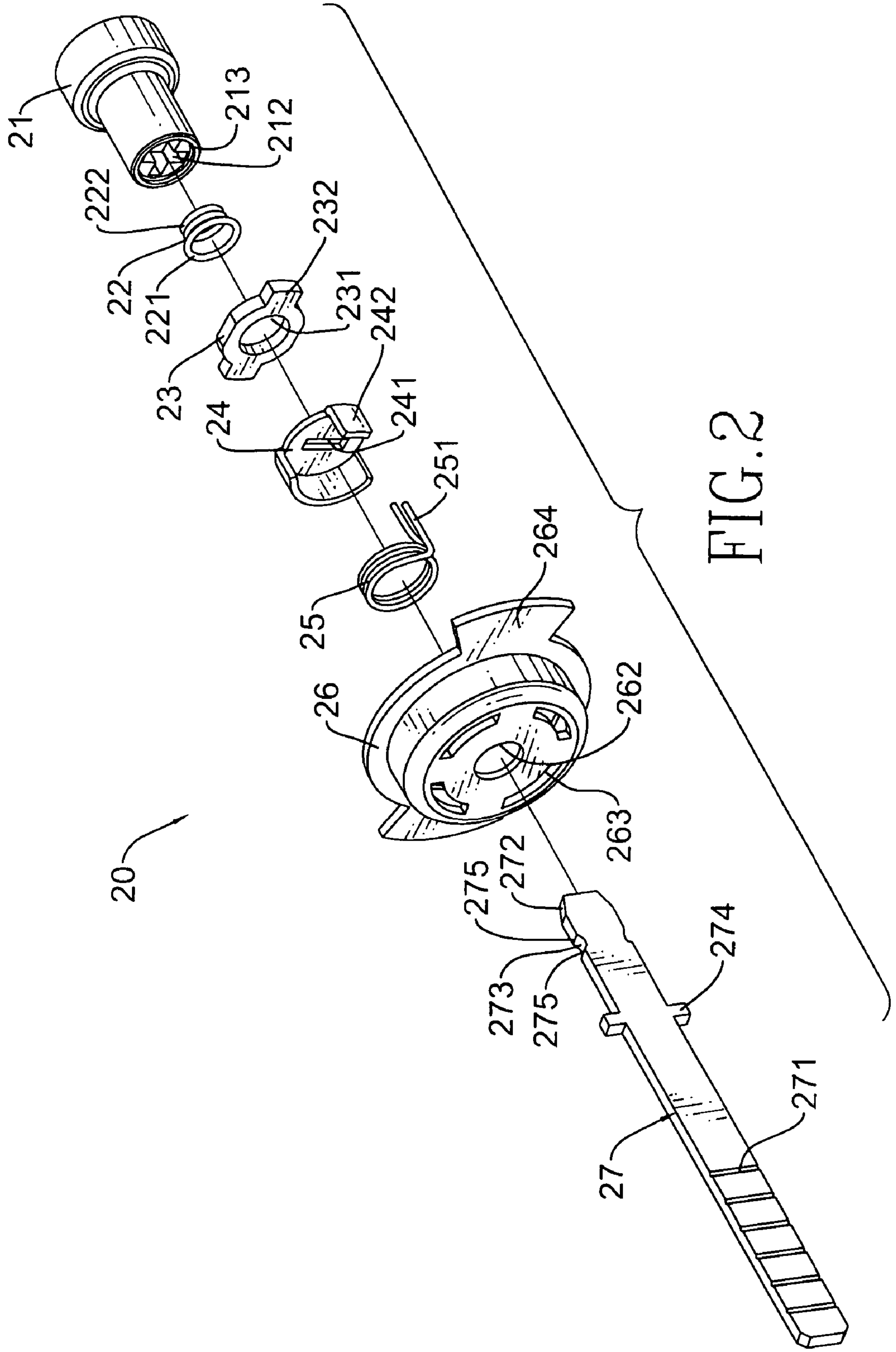
FIG. 2 is an exploded perspective view of the latch driving unit in FIG. 1.
Figure 4:
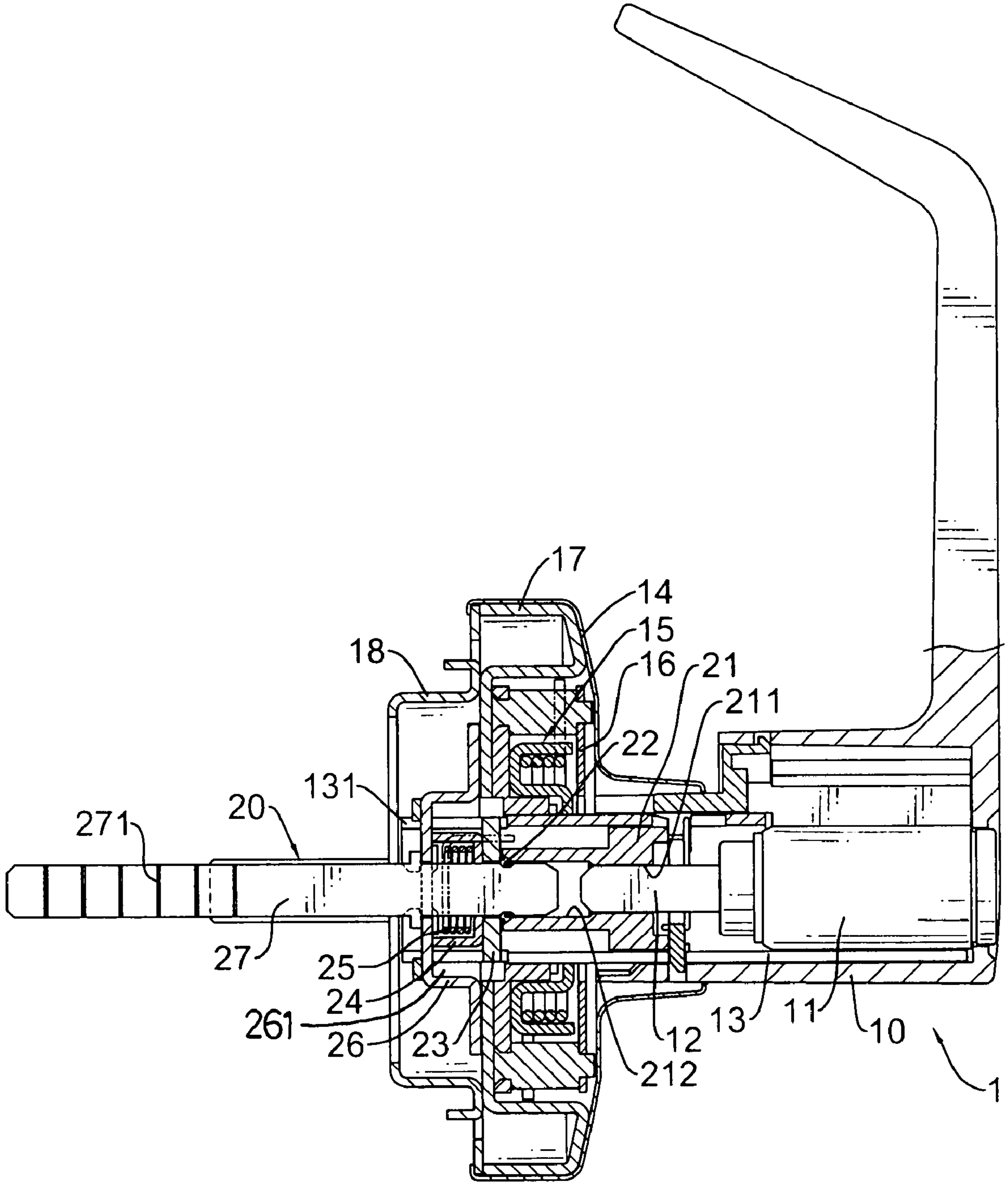
FIG. 4 is a top sectional view of FIG. 1.
Figure 5:
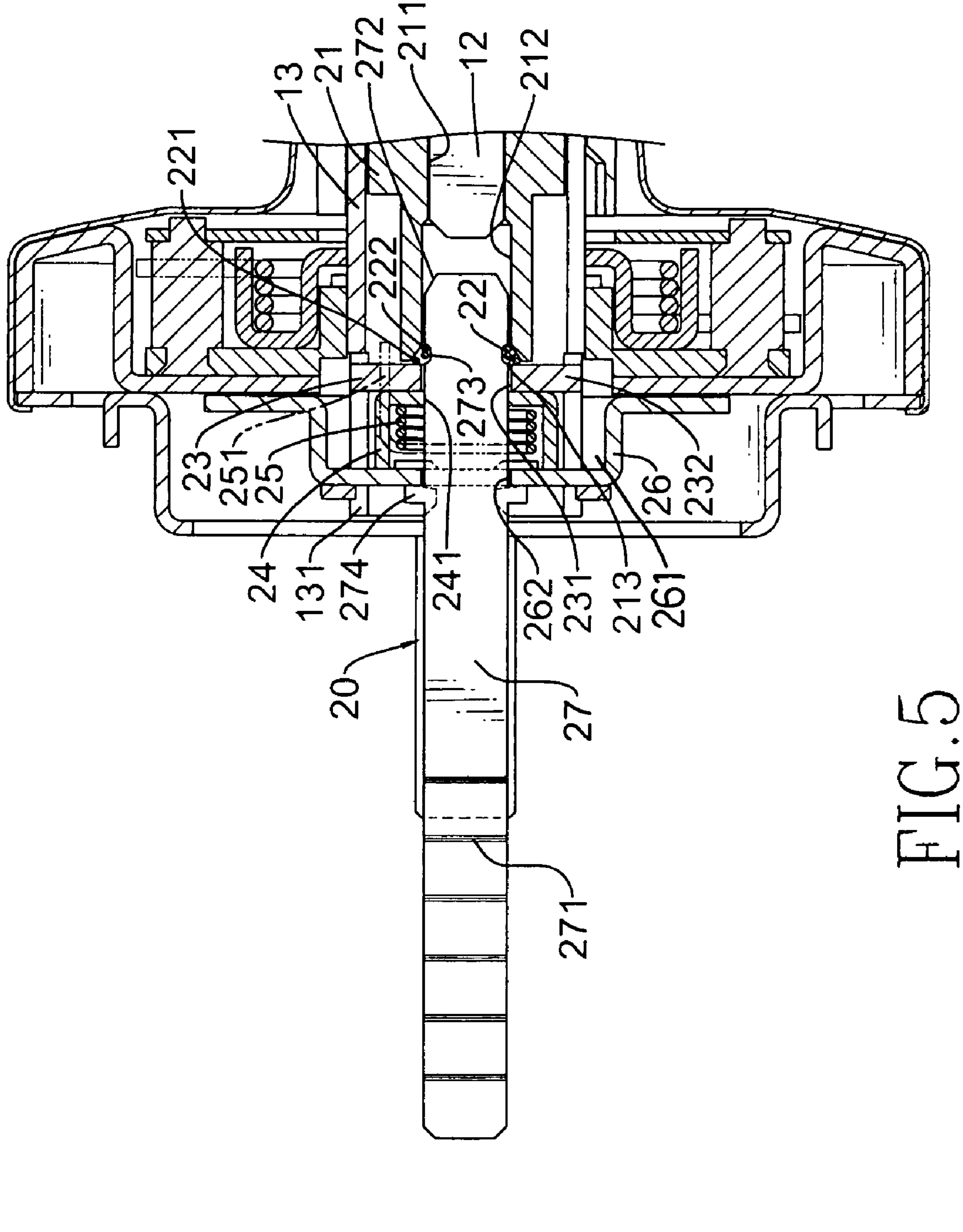
FIG. 5 is a partially enlarged view of FIG. 4.

With reference to FIGS. 2, 4 and 5, the latch driving unit (20) is received in the turnable barrel (13), and includes a pin (21), a resilient member (22), a locking disk (23), a rotatable disk (24), a torsion spring (25), a cap (26) and a strip (27).

The pin (21) has a first hole (211) defined at a first end facing the locking core ( 11) for receiving a tongue (12) of the locking core (1 1). A second hole (212) with a cruciform or I-like cross section is defined at a second end of the pin (21). A tapered counter bore (213) is defined outside the second hole (212).

The cap (26) has a chamber (261) facing the second end of the pin (21), and a central opening (262) defined through the chamber (261) and aligned with the second hole (212) of the pin (21). Multiple arcuate slots (263) are defined around the central opening (262) for securing the turnable barrel (13). Two wings (264) are respectively formed at two diametrically opposite sides of the cap (26).

The locking disk (23) is provided between the pin (21) and the cap (26). An aperture (231) is defined through the locking disk (23) and aligned with the second hole (212) of the pin (21). Two teeth (232) are formed at an outer circumference of the locking disk (23) and extend outwards.

The resilient member (22) is provided between the locking disk (23) and the pin (21) and positioned in the tapered counter bore (213). The resilient member (22) can be a compression spring with at least two coils, as shown in FIG. 2, or a ring (22A) with a gap (223A), as shown in FIG. 3.

As illustrated in FIG. 2, the compression spring (22) has three coils, wherein a bottom coil (221) has an outer diameter larger than a diameter of the aperture (231) for abutting the bottom coil (221) on a surface of the locking disk (23) facing the pin (21), and the remaining coils (222) have an inner diameter smaller than that of the bottom coil (221) for attaching the strip (27) and positioned in the tapered counter bore (213).

Figure 3:
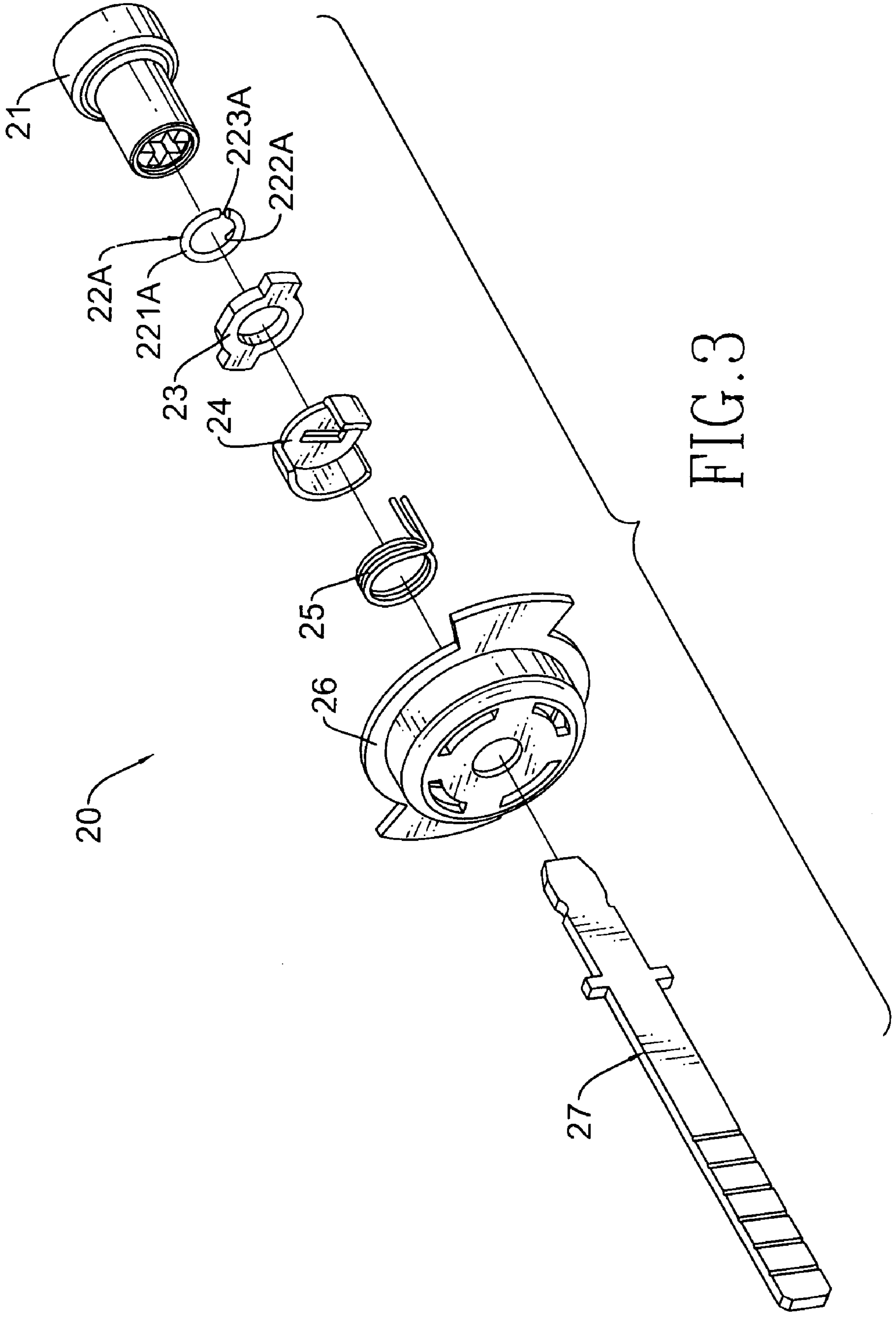
FIG. 3 is an exploded perspective view of another embodiment of the latch driving unit in accordance with the invention.

As illustrated in FIG. 3, the ring (22A) has a coil (221A) with an outer diameter larger than a diameter of the aperture (231) for abutting the coil (221A) on the surface of the locking disk (23) facing the pin (21). The strip (27) is positioned in an inner circumference (222A) of the ring (22A).

With reference back to FIGS. 2 and 4, the rotatable disk (24) is provided between the locking disk (23) and the cap (26). An orifice (241) with a cruciform or I-like cross section is defined through the rotatable disk (24). An ear (242) is formed at an outer circumference of the rotatable disk (24) and extends towards the cap (26).

The torsion spring (25) has two legs (251) respectively extending over upper and lower edges of the ear (242) of the rotatable disk (24) and attached to one of the teeth (242) of the locking disk (23). The rotatable disk (24) and the torsion spring (25) are received in the chamber (261).

The strip (27) extends through the cap (26), the rotatable disk (241), the locking disk (23), and the resilient member (22), and is inserted in the second hole (212). A plurality of nicks (271) is defined on the strip (27) to facilitate bending the strip (27) at an appropriate one of the nicks (271). Two bevels (272) are respectively formed at two sides of the front end of the strip (27). Two notches (273) are respectively defined behind the bevels (272) for positioning the resilient member (22). Each of the notches (273) is defined with two guide slopes (275) to facilitate the resilient member (22) being engaged in/disengaged from the notches (273). Two shoulders (274) are formed behind the notches (273) and abut the cap (26) in assembly.

As illustrated in FIGS. 1, 4, and 5, the latching driving unit (20) is received in the turnable barrel (13), and the tongue (12) of the locking core (11) is inserted in the first hole (211) of the pin (21). The panel cylinder (14), the torsion spring assembly (15), the gasket (16), the interior cylinder (17), and the back cylinder (18) are provided outside the turnable barrel (13) to construct the exterior knob assembly (1).

Figure 6:
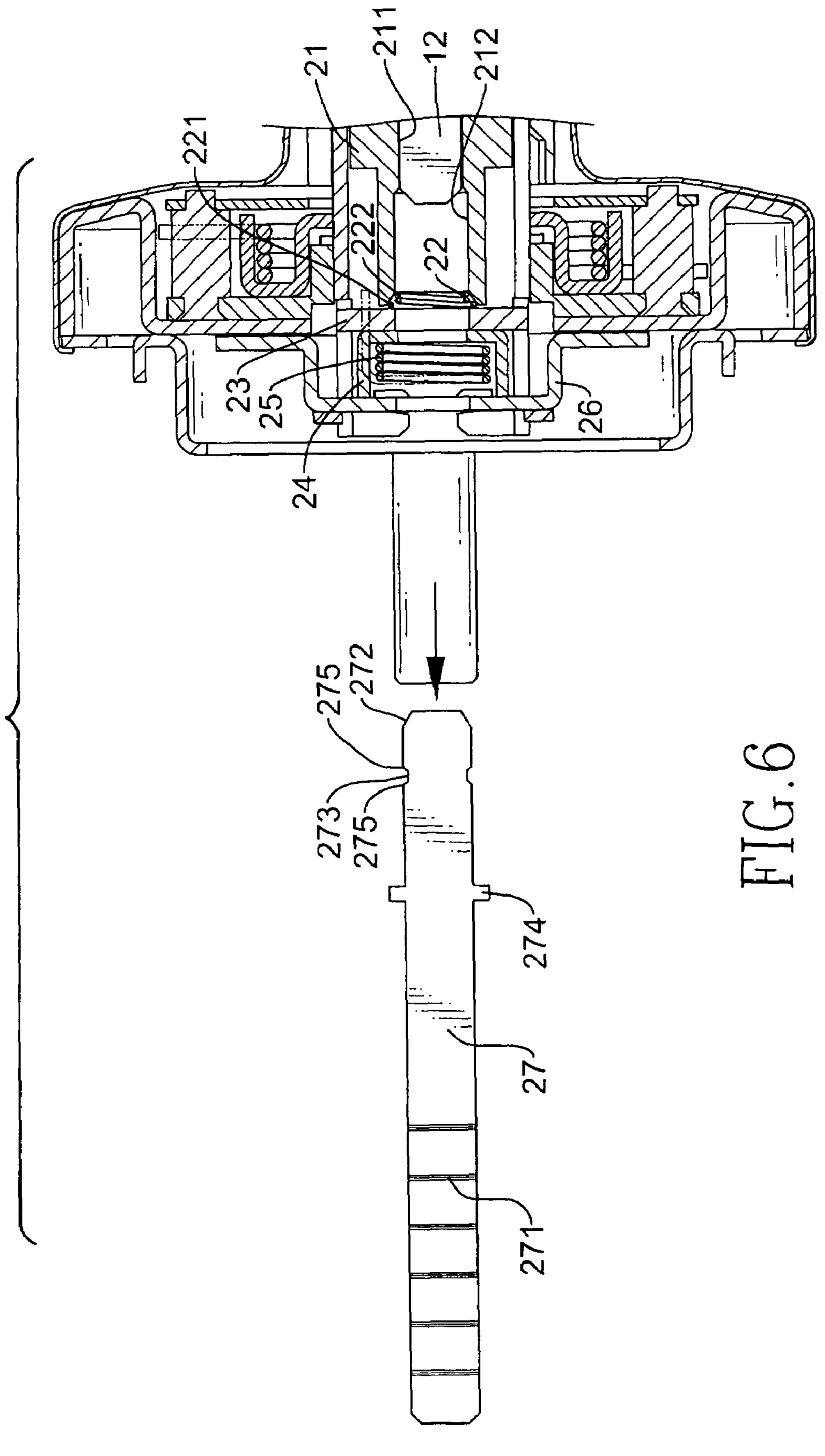
FIG. 6 is a top view showing a strip of the latch driving unit being removed from the exterior knob assembly.
Figure 7:
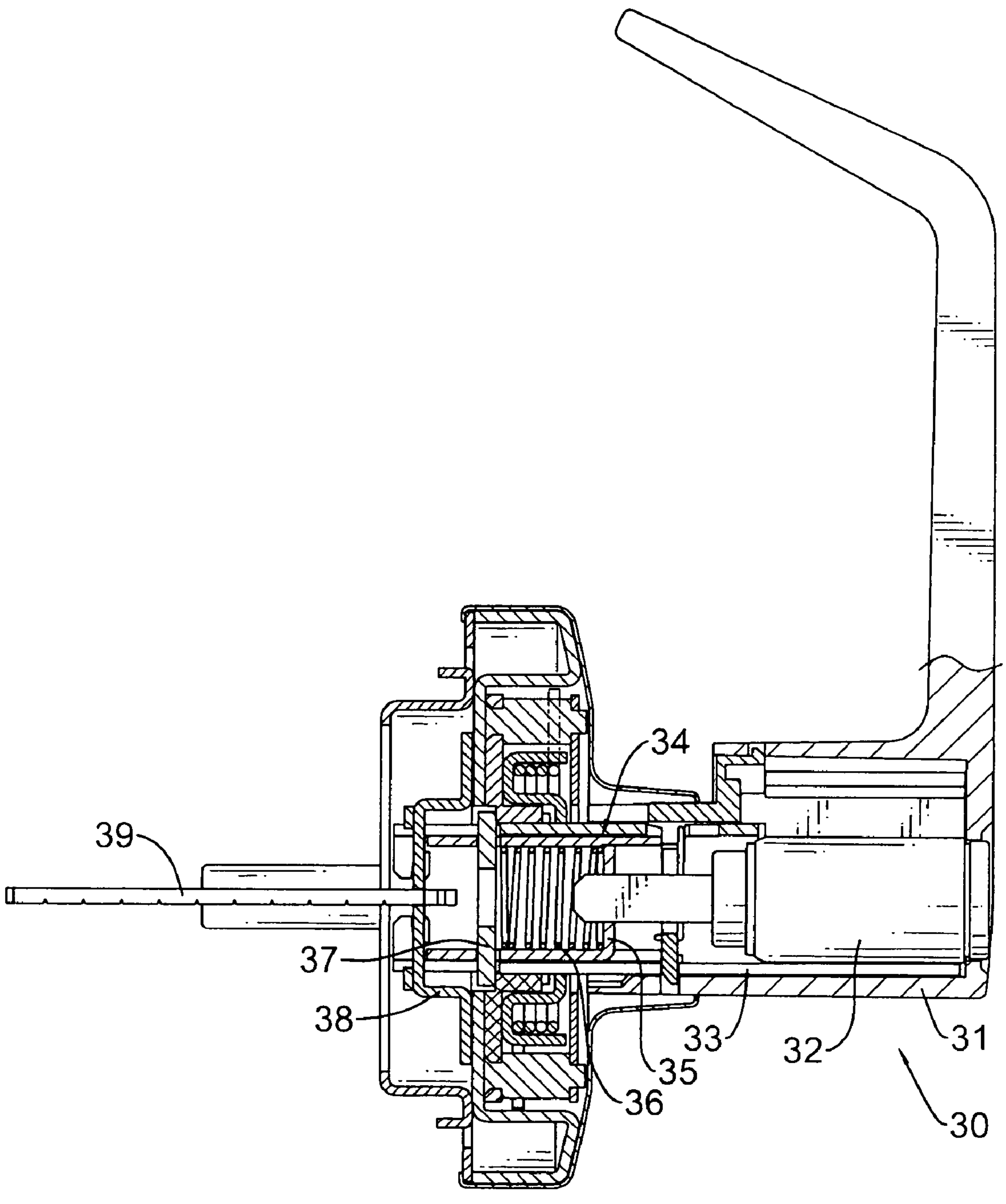
FIG.7 PRIOR ART
FIG. 7 is a top sectional view of a conventional exterior knob assembly.
Figure 8:
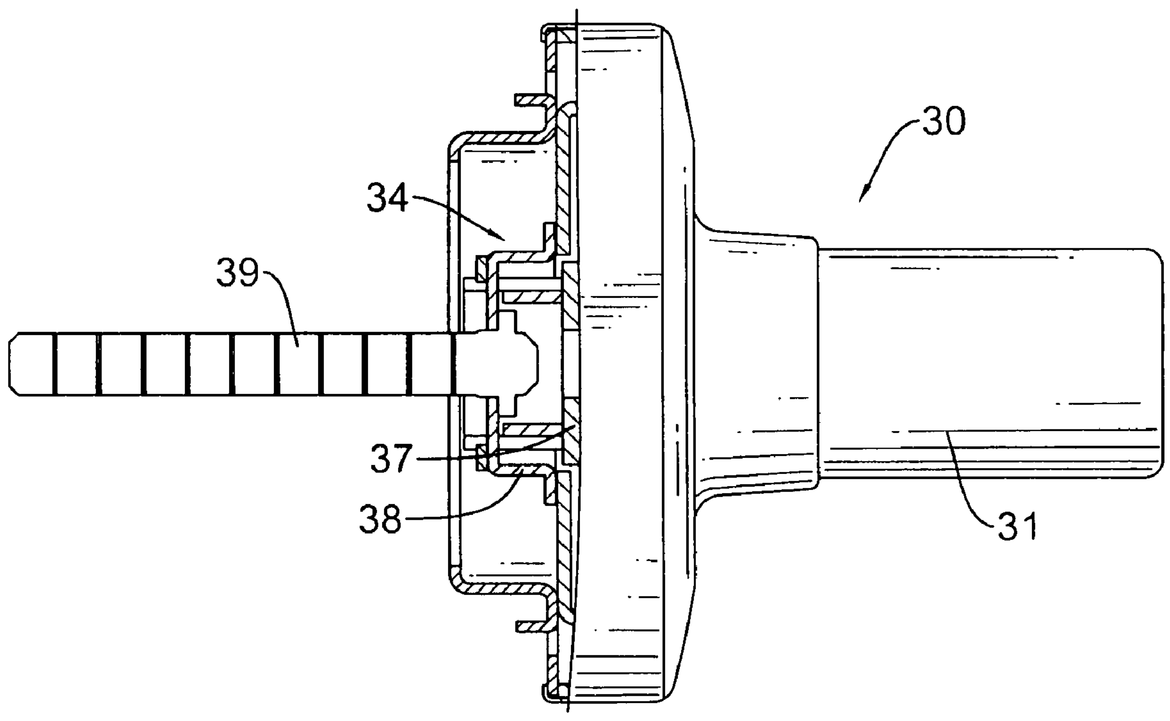
FIG.8 PRIOR ART
FIG. 8 is a front sectional view of the conventional exterior knob in FIG. 7.

For installing the exterior handle assembly (1) on a door, the strip (27) can be bent at a proper nick (271) corresponding to a thickness of the door and the unwanted part of the strip (27) is removed. If the strip (27) is bent at an incorrect nick (271) and becomes too short for the door, as shown in FIG. 6, the strip (27) can be individually pulled out and replaced with another intact strip (27). Because the strip (27) is provided with the bevels (272) and the guide slopes (275), it is easy to disengage/engage the strip (27) from/to the resilient member (22). Therefore, the exterior knob assembly is still useful after replacing the strip (27), and waste is avoided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A latch driving unit for a door lock comprising:

a pin (21) having a first hole (211) defined at a first end of the pin (21), and a second hole (212) defined at a second end of the pin (21);

a locking disk (23) provided at the second end of the pin (21), the locking disk (23) having an aperture (231) aligned with the second hole (212) of the pin (21), and two teeth (232) formed at an outer circumference of the locking disk (23);

a resilient member (22) provided between the pin (21) and the locking disk (23), the resilient member (22) having a portion (221) abutting the locking disk (23), and a portion to fasten a strip (27);

a rotatable disk (24) provided at a side of the locking disk (23) opposed to the resilient member (22), the rotatable disk (24) having an orifice (241) aligned with the aperture (231) and the second hole (212), and an ear (242) formed at an outer circumference of the rotatable disk (24) and aligned with one of the teeth (232) of the locking disk (23);

a cap (26) provided at a side of the rotatable disk (24) and opposed to the locking disk (23), the cap (26) having a chamber (261) defined at a side facing the rotatable disk (24) for receiving the rotatable disk (24), a central opening (262) defined through the cap (26), and multiple arcuate slots (263) defined around the central opening (262);

a torsion spring (25) provided between the cap (26) and the rotatable (24) and received in the chamber (261), the torsion spring (25) having two legs (251) respectively extending over upper and lower edges of the ear (242) and attached to the corresponding one of the teeth (232); and the strip (27) extending sequentially through the central opening (262), the torsion spring (25), the orifice (241), the aperture (231), the resilient member (22) and inserted into the second hole (212) of the pin (21), the strip (27) having multiple nicks (271) defined on a surface of the strip (27), two bevels (272) respectively defined at two sides of a front end of the strip (27), two notches (273) respectively defined behind the bevels (272) for positioning the resilient member (22), and two shoulders (274) respectively formed behind the notches (273) and blocked by the cap (26).

2. The latching driving unit as claimed in claim 1, wherein the resilient member (22) is a compression spring (22) with at least two coils, wherein a bottom coil (221) with an outer diameter larger than a diameter of the aperture (231) abuts the locking disk (23), and the remaining coils (222) have an inner diameter smaller than an inner diameter of the bottom coil (221) for attaching the strip (27).

3. The latching driving unit as claimed in claim 1, wherein the resilient member (22) is a ring (22A) with a gap (223A), which has a coil (221A) with an outer diameter larger than a diameter of the aperture (231) and which abuts the locking disk (23), and the strip (27) is attached to an inner circumference (222A) of the ring (22A).

4. The latching driving unit as claimed in claim 1, wherein each of the notches (273) is defined with two guide slopes (275) to facilitate the resilient member (22) being engaged in/disengaged from the notches (273).

5. The latching driving unit as claimed in claim 1, wherein the pin (21) has a tapered counter bore (213) defined at the second end of the pin (21), and the resilient member (22) is positioned in the tapered counter bore (213).

6. The latching driving unit as claimed in claim 1, wherein the second hole (212) has a cruciform cross section.

7. The latching driving unit as claimed in claim 1, wherein the orifice (241) has an I-like cross section.

* * * * *